United States Patent [19]

Hashimoto

[11] E Patent Number: Re. 33,507

[45] Reissued Date of Patent: Dec. 25, 1990

[54] CORDLESS TELEPHONE WITH AUTOMATIC TELEPHONE ANSWERING/RECORDING FUNCTION

[75] Inventor: Kazuo Hashimoto, Tokyo, Japan

[73] Assignee: Hashimoto Corporation, Tokyo, Japan

[21] Appl. No.: 375,561

[22] Filed: Jun. 29, 1989

Related U.S. Patent Documents

Reissue of:

[64] Patent No.: 4,677,655
Issued: Jun. 30, 1987
Appl. No.: 740,206
Filed: May 31, 1985

[30] Foreign Application Priority Data

Jun. 1, 1984 [JP] Japan ..... 59-112375

[51] Int. Cl.[5] ..... H04M 11/10

[52] U.S. Cl. ..... 379/61; 379/63; 379/58; 379/82

[58] Field of Search ..... 379/56, 57, 58, 63, 379/61, 62, 82, 70, 79, 105, 102; 455/73

[56] References Cited

U.S. PATENT DOCUMENTS

| | | | |
|---|---|---|---|
| 4,232,195 | 11/1980 | Bartelink | 179/2 A |
| 4,468,539 | 8/1984 | Schober | 179/2 EA |
| 4,500,752 | 2/1985 | Lee | 379/82 |
| 4,508,935 | 4/1985 | Mastromoro | 179/2 EA |
| 4,677,655 | 6/1987 | Hashimoto | 379/61 |
| 4,706,274 | 11/1987 | Baker et al. | 379/61 |

FOREIGN PATENT DOCUMENTS

| | | | |
|---|---|---|---|
| 0024245 | 2/1983 | Japan | 455/73 |

*Primary Examiner*—Jin F. Ng
*Assistant Examiner*—Magdy Shehata
*Attorney, Agent, or Firm*—Lowe, Price, LeBlanc, Becker & Shur

[57] ABSTRACT

A cordless telephone having a base unit with automatic telephone answering function and a portable unit has an engaging means for forming an engaging circuit upon an incoming call from a calling party, when the portable unit is kept in the off-hook state over a preset period of time during sending of outgoing message from the base unit, and an outgoing message inhibiting circuit which activated by output of preset timer means and inhibit outgoing message then both parties' conversation can be recorded in recording means on base unit which is set in stand-by mode.

7 Claims, 2 Drawing Sheets

CORDLESS TELEPHONE WITH AUTOMATIC TELEPHONE ANSWERING/RECORDING FUNCTION

Matter enclosed in heavy brackets [ ] appears in the original patent but forms no part of this reissue specification; matter printed in italics indicates the additions made by reissue.

*This is a reissue of U.S. Pat. No. 4,677,655, issued June 30, 1987.*

BACKGROUND OF THE INVENTION

The present invention relates to a novel apparatus which functionally combines a cordless telephone and an automatic telephone answering apparatus.

Conventional apparatuses obtained by combining a cordless telephone and an automatic telephone answering apparatus have been limited to a type wherein the cordless telephone and the automatic telephone answering apparatus are coupled in parallel to a pair of telephone lines. A portable unit cannot control record/play operation in such an automatic telephone answering apparatus.

SUMMARY OF THE INVENTION

It is, therefore, an object of the present invention to provide a cordless telephone, wherein a portable unit is set in the off-hook state when a base unit (a base-side telephone) calls the portable unit upon reception of an incoming call from a calling party or an automatic telephone answering/recording means (to be referred to as a TAD hereinafter) coupled to the base unit is started, thereby variously controlling the TAD while communication between a called party and the calling party is established.

It is another object of the present invention to provide a cordless telephone wherein an outgoing message will not continue to be sent after a preset period of time in order to allow the called party to directly communicate with the calling party when the portable unit is set in the off-hook state during sending of the outgoing message from the TAD after a ringing tone at the portable unit is stopped; however, the outgoing message will not be interrupted to allow recording of an incoming message from the calling party within a TAD control time when the portable unit is set in the off-hook state again within the preset period of time.

It is still another object of the present invention to provide a cordless telephone wherein an incoming message recording unit is kept operative when the portable unit is set in the off-hook state during recording of the incoming message from the calling party until the portable unit is set in the on-hook state without limiting the recording time.

It is still another object of the present invention to provide a cordless telephone for remote controlling the recording/reproducing apparatus of the TAD with an intercom function call button.

An advantage of the present invention is that a conventional cordless telephone is functionally combined with an automatic telephone answering apparatus to operate the TAD functionally operated with the base unit for a preset period of time, and the portable unit is set in the off-hook state for the preset period of time, thereby arbitrarily controlling driving of an outgoing or incoming message recording unit in the TAD. The present invention thus widens a range of practical application of an apparatus of this type.

According to the present invention, there is provided a cordless telephone with an automatic telephone answering/recording function, comprising a base unit incorporating an automatic telephone answering means for sending an outgoing message and recording an incoming message, and a portable unit. The cordless telephone comprises a ringing circuit. The ringing circuit constitutes an engaging circuit upon reception of a predetermined number of ringing tones from a calling party. When the portable unit is kept in the off-hook state for a preset period of time while the outgoing message is being sent from the automatic telephone answering means, a timer means generates an output. An outgoing message inhibiting circuit stops generating the outgoing message from the automatic telephone answering means in response to the output from the timer means. A manual selection switch is arranged in a recording circuit for recording an incoming message signal from the calling party in the automatic telephone answering means and in parallel with a recording circuit disabling means. When the portable unit is set in the off-hook state, the recording circuit disabling means disables the recording circuit. After the automatic telephone answering means sends the outgoing message onto the telephone lines, the manual selection switch is turned on to record conversation in the automatic telephone answering apparatus when the portable unit is set in the off-hook state during recording of the incoming message. Special modes of the automatic telephone answering apparatus can be controlled by the intercom function call button of the portable unit.

DETAILED DESCRIPTION OF THE PREFERRED EMBODIMENT

The present invention will be described in detail with reference to a preferred embodiment in conjunction with the accompanying drawings.

Figure 1:
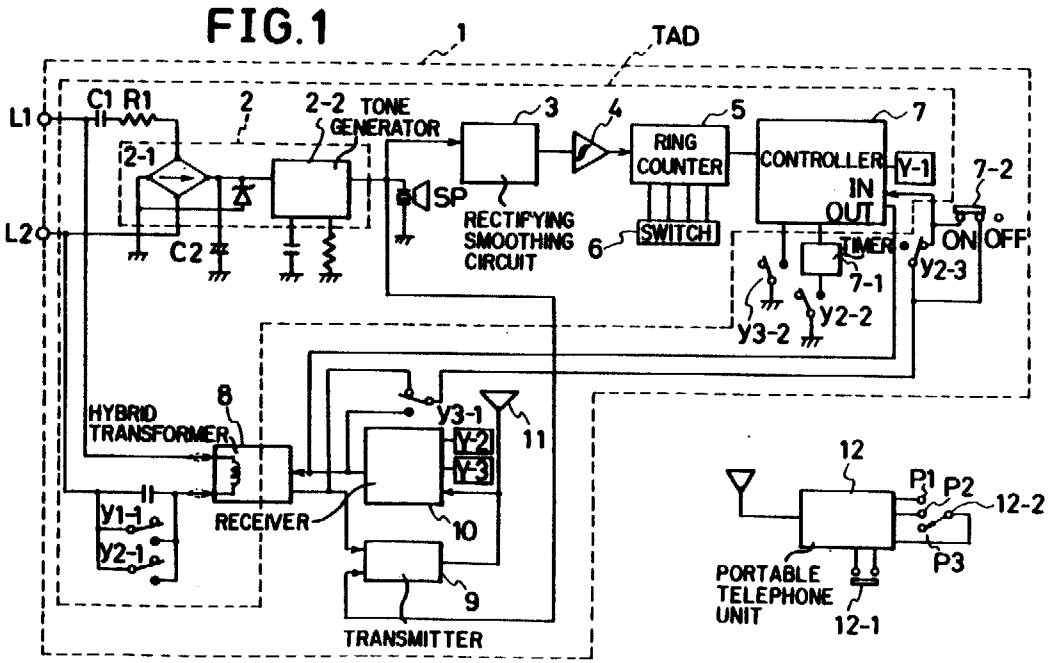
FIG. 1 is a circuit diagram showing the main part of a cordless telephone according to an embodiment of the present invention.
Figure 2:
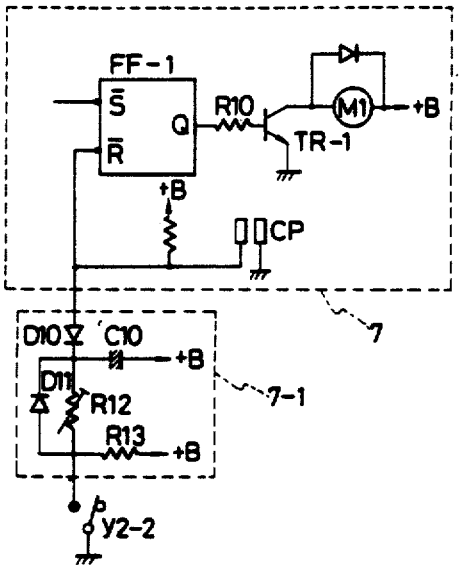
FIG. 2 is a circuit diagram of a timer of FIG. 1 and a controller associated therewith.

FIGS. 1 and 2 show a cordless telephone according to an embodiment of the present invention. Reference numeral 1 denotes a cordless telephone set having an automatic telephone answering/recording function. The cordless telephone 1 is a base unit, i.e., a base station. Reference symbol TAD denotes a section for sending an outgoing message and recording an incoming message in the base unit 1. Reference symbols L1 and L2 denote telephone lines; and 2, a tone ringer circuit (e.g., a PSB6520 available from Siemens Components, Inc., U.S.A.) for generating a tone in response to a ringing signal. The tone ringer circuit 2 comprises a bridge diode 2-1 for rectifying the ringing signal received through a capacitor C1 and a resistor R1, a capacitor C2 for smoothing an output from the bridge diode 2-1, and a tone generator 2-2 for alternately generating two tone frequencies and driving a loudspeaker SP. Reference numeral 3 denotes a rectifying/smoothing circuit for converting to a DC signal a tone signal generated from the tone ringer circuit 2; 4, a Schmitt trigger circuit for waveshaping the DC signal; 5, a bell number counter for counting the number of bells, i.e., the number of tones generated in response to the ringing signal; and 6, a bell number generator including a digital switch for setting the bell number to be a predetermined value. The bell number generator 6 generates a signal of logic "1" at the predetermined bell number count. When the bells are interrupted, the count of the counter 5 is reset to the initial value. Reference numeral 7 denotes an engaging/answering/recording controller including an incoming message recording/reproducing means (not shown) with an outgoing message recording medium, an incoming message recording/reproducing means (not shown) with an incoming message recording medium, and a control circuit (not shown) for controlling the operating states of the outgoing and incoming recording/reproducing means and of an engaging relay Y-1. The controller 7 is started in response to an output from the counter 5 and drives the relay Y-1 to send the outgoing message onto the telephone lines, thereby controlling engagement, answering and recording of the incoming message from the calling party. The outgoing and incoming message recording/reproducing means may comprise an IC memory.

Reference numeral 7-1 denotes a variable timer having a preset time of 0 to several seconds (e.g., 4 seconds). When a portable unit 12 (to be described later) is set in the off-hook state, a contact y2-2 of a relay Y-2 is set at the illustrated position, and the timer 7-1 is started. Thereafter, when the portable unit 12 is kept in the off-hook state for longer than the preset several seconds and the contact y2-2 is kept on for the preset period of time, an output from the timer 7-1 is supplied to the controller 7, thereby stopping the outgoing message. More specifically, as shown in FIG. 2, the variable timer 7-1 comprises a charge/discharge circuit of resistors R12 and R13, a capacitor C10 and diodes D10 and D11, which is connected to a power source +B. The variable timer 7-1 is connected to a reset terminal $\overline{R}$ of a flip-flop FF-1 in the controller 7 through the normally OFF diode D10. An output terminal Q of the flip-flop FF-1 is connected to an outgoing message recording medium drive motor M1 through a resistor R10 and a transistor TR-1. When the closed state of the contact y2-2 is kept for the preset period of time, the motor M1 is stopped. It should be noted that reference symbol CP denotes a detection contact for a start point of the outgoing message recording medium.

Reference numeral 7-2 denotes a manual selection switch connected between a fixed terminal of a contact y2-3 in the relay Y-2 and an input terminal IN of the controller 7. The manual selection switch 7-2 selectively disables the incoming message recording means (not shown) in the controller 7 or causes the recording means to continue recording of conversation between the called party and the calling party when the portable unit 12 is set in the off-hook state and the normally closed contact y2-3 in the relay Y-2 is opened during recording of the incoming message in the incoming message recording medium of the automatic telephone answering apparatus.

Reference numeral 8 denotes a hybrid transformer; 9, a transmitter; and 10, a receiver. The transmitter 9 transmits a tone from the tone ringer circuit 2 through an antenna 11 to call the portable unit 12 upon reception of an incoming call. When the called party, unhooks the portable unit 12 held in the waiting state in response to the incoming call, a detection switch 12-2 synchronized with the off-hook operation of the portable unit 12 is held in a "closed" position P1. Upon this switching, the receiver 10 is operated to close a totally open contact y2-1 of the relay Y-2 to form an engaging circuit. The transmitter 9 transmits to the portable unit 12 an incoming message sent through the telephone lines L1 and L2 after communication between the called and calling parties is established. The receiver 10 receives a speech signal from the portable unit 12 and sends it onto the telephone lines L1 and L2.

The portable unit 12 comprises a call button 12-1. When the call button 12-1 is depressed, it generates a special signal. The receiver 10 operates a relay Y-3 in response to the special signal.

The operation of the cordless telephone as arranged above will be described in detail.

When a ringing signal is received from a calling party through the telephone lines L1 and L2, the ringing signal is supplied to the tone ringer circuit 2 through the capacitor C1 and the resistor R1. The tone from the tone ringer circuit 2 is rectified by the bridge diode 2-1 and smoothed by the capacitor C2. The smoothed signal is supplied to the tone generator 2-2 which then generates a tone output. The tone output is emitted by the low-power loudspeaker SP. At the same time, the tone output is converted to the DC signal which is waveshaped by the Schmitt trigger circuit 4. The waveshaped signal is supplied to the bell number counter 5. The tone output from the tone ringer circuit 2 is also supplied to the portable unit 12 through the transmitter 9. Assume that a preset number in the bell number generator 6 is set to be "5". When the calling party answers the phone at the portable unit 12 before the relay Y-1 is energized and the fifth tone is supplied to the portable unit 12, the detection switch 12-2 is switched from a "wait" position P2 to the "closed" position P1, and the relay Y-2 in the receiver 10 is held operative. An engaging state is established through the normally open contact y2-1 and the primary winding of the hybrid transformer 8. In this state, the tone is stopped, no output is generated from the bell number counter 5, and the engaging/answering/recording controller 7 is kept off. Therefore, communication between the called party and the calling party is established.

When the portable unit 12 is set in the on-hook state after completion of conversation, the detection switch 12-2 is held in the "wait" position P2. The relay Y-2 in the receiver 10 is deenergized. When a normally open contact y1-1 is already opened by the contact y2-1, the engaging state is cancelled. As a result, the cordless telephone 1 is set in the waiting state.

A case will be described wherein a ringing signal is supplied to the cordless telephone 1 and the called party cannot answer the phone due to absence. While the tone is produced at the loudspeaker SP or the portable unit 12, the bell number counter 5 generates a signal of logic "1" when the fifth tone is generated, as explained in the above description, thereby driving the engaging/answering/recording controller 7. In this case, the engaging relay Y-1 is energized, and its normally open contact y1-1 is closed. As described above, an engaging state is established through the hybrid transformer 8, and the tone is stopped. Subsequently, the outgoing message is generated from an output terminal OUT of the engaging/answering/recording controller 7 and is sent onto the telephone lines L1 and L2 through the hybrid transformer 8. When the outgoing message is completely sent to the calling party, an incoming message recording medium (not shown) is driven to record the incoming message from the calling party through contacts y3-1 and y2-3 and the input terminal IN of the controller 7. A known VOX circuit is used to check whether or not a timer (not shown) counts the preset period of time. When the timer has counted the preset period of time, the incoming message recording medium is stopped and the system is held in the waiting state.

When the portable unit 12 is set in the off-hook state during sending of the outgoing message, the relay Y-2 is held operative, and the variable timer 7-1 is started through the contact y2-2. The capacitor C10 is then charged through the variable resistor R12. When the capacitor C10 is charged at a predetermined value within 4 seconds preset by the variable resistor R12, the diode D10 is turned on. The reset terminal $\overline{R}$ of the flip-flop FF-1 is set at a low voltage level so that the flip-flop FF-1 is reset to stop driving the outgoing message recording/reproducing means (not shown). When a magnetic recording tape is used for an outgoing message, the tape is stopped and is rewound to the start point by a known means. When a time interval within which the outgoing message is interrupted after the portable unit 12 is set in the off-hook state is several seconds counted by the variable timer 7-1, the voice of the calling party is overlapped by the hybrid transformer 8 on the outgoing message having a low level and can be heard at the portable unit 12. If the called party wishes to talk with the calling party, the portable unit 12 is kept in the off-hook state after several seconds preset by the variable timer 7-1 have elapsed, thereby interrupting the outgoing message and establishing communication between the called party and the calling party. However, when the called party sets the portable unit 12 in the off-hook state but does not wish to talk with the calling party, the portable unit 12 is set in the on-hook state within a few seconds to deenergize the relay Y-2. In this case, the timer 7-1 is kept inoperative, and the outgoing message reproducing means (not shown) is not interrupted but is continuously driven (in this case, if the off-hook operation is performed again and then the on-hook operation is performed before the timer 7-1 is started, the monitor operation can be repeated). Therefore, the calling party does not hear the off-hook operation by the called party and records his own incoming message after hearing the outgoing message. As described above, when the outgoing message reproducing means comprises a tape, the tape must be rewound to the start position after the system is set in the waiting mode.

When the portable unit 12 is set in the off-hook state during recording of the incoming message after the TAD is started, the contact y2-3 is opened. In this case, when the selection switch 7-2 is kept "ON", the input terminal IN of the controller 7 is continuously connected to the hybrid transformer 8 irrespective of the operating state of the contact y2-3. Speech signals from the calling and called parties are supplied to the input terminal IN of the controller 7 to operate a recording means (not shown) by a known built-in VOX circuit (not shown), so that conversation can be recorded without limiting the recording time. However, if the selection switch 7-2 is held in the "OFF" position, when the contact y2-3 is opened, supply of speech signals to the terminal IN is stopped. The recording medium is stopped by the VOX circuit within a few seconds, and conversation will no longer be recorded.

As described above, the voice of the calling party can be monitored at the portable unit 12 during sending of the outgoing message. When the portable unit 12 is set in the off-hook state, even in a switching system wherein a lockout tone or dial tone is not immediately generated, the outgoing message will not be sent onto the telephone lines. When the calling party hangs up during sending of the outgoing message, the hybrid transformer 8 connected to the telephone lines L1 and L2 is unbalanced, so that the outgoing message is heard at a different tone of high level. In this case, the called party can know that the calling party has already hung up the phone.

When the intercom function button (to be referred to as a call button hereinafter) 12-1 is depressed at the portable unit 12, the following function can be performed. When the call button 12-1 in the portable unit 12 is depressed during sending of the outgoing message, a special tone is transmitted from the portable unit 12 and received by the receiver 10. In the receiver 10, the special tone is detected by a filter (not shown) to keep energizing the relay Y-3. Operations such as remote control operation for controlling the incoming message recording medium and memo recording for recording a memo on the incoming message recording medium from the portable unit 12 can be performed in accordance with the operating states of the contacts of the relay Y-3. For example, when the portable unit 12 calls the base unit 1 through the contacts y3-1 and y3-2, the path of the speech signal is changed and only the incoming message recording medium is driven to record the memo from the portable unit 12, thereby increasing the functions of the system.

What is claimed is:

1. A cordless telephone incorporating a base unit with an automatic telephone answering and recording means, an outgoing message generation means and a portable unit, wherein said base unit has a ring detection circuit including means to establish an off-hook condition on the telephone line circuit upon receipt of an incoming call from a remote calling party, and an outgoing message inhibiting circuit for interrupting said outgoing message generation means so as not to generate an outgoing message and to thereby allow a local called party to communicate with the remote calling party without both parties being disturbed by the outgoing message when said portable unit is set in a press talk mode (off-hook mode).

2. A cordless telephone according to claim 1, wherein said outgoing message inhibiting circuit inhibits said outgoing message generation means after a predetermined time period while the outgoing message is being sent by said base unit onto the telephone lines.

3. A cordless telephone according to claim 2, wherein said predetermined time period is selectable within a range of up to a few seconds.

4. A cordless telephone according to claim 2, wherein an outgoing message is continuously sent to a calling party is said portable unit is hung up (on-hook state) within said predetermined period, and further comprising an incoming recording means to record an incoming message if the calling party speaks.

5. A cordless telephone incorporating a base unit with an automatic telephone answering and recording means, an outgoing message generation means and a portable unit having a selection switch, wherein said base unit has a ring detection circuit including means to establish an off-hook condition on the telephone line circuit upon receipt of an incoming call from a remote calling party, outgoing message inhibiting means for interrupting said outgoing message generation means so as not to generate an outgoing message and thereby to allow a local called party to communicate with the remote calling party without both parties being disturbed by the outgoing message when said portable unit is set in a press talk mode (off-hook mode), and two-way conversation recording means responsive to said selection switch for audio recording, said audio recording being carried out while the portable unit is held in the off-hook state, following sending of the outgoing message onto said telephone lines, and until said portable unit is hung up (on-hook state).

6. A cordless telephone according to claim 5, further comprising intercom means for remotely controlling said base unit from said portable unit by operating a call button of said portable unit when said base unit is in a stand-by mode.

*7. A cordless telephone according to claim 5, further comprising intercom means for remotely controlling said base unit from said portable unit by operating a call button of said portable unit.*

* * * * *

UNITED STATES PATENT AND TRADEMARK OFFICE

CERTIFICATE OF CORRECTION

PATENT NO. : Re. 33,507

DATED : December 25, 1990

INVENTOR(S) : Kazuo HASHIMOTO

It is certified that error appears in the above-identified patent and that said Letters Patent is hereby corrected as shown below:

In column 6, line 57, change "is" (first occurrence) to --if--.

Signed and Sealed this

Nineteenth Day of October, 1993

Bruce Lehman

*Attest:*

BRUCE LEHMAN

*Attesting Officer*

*Commissioner of Patents and Trademarks*

US00RE33507C1

(12) REEXAMINATION CERTIFICATE (4580th)

United States Patent

Hashimoto

(10) Number: US RE33,507 C1

(45) Certificate Issued: May 28, 2002

(54) CORDLESS TELEPHONE WITH AUTOMATIC TELEPHONE ANSWERING/ RECORDING FUNCTION

(75) Inventor: Kazuo Hashimoto, Tokyo (JP)

(73) Assignee: Phonetel Communications, Inc., Fort Worth, TX (US)

Reexamination Request:
No. 90/004,623, Apr. 30, 1997

Reexamination Certificate for:

| | |
|---|---|
| Patent No.: | **Re. 33,507** |
| Issued: | **Dec. 25, 1990** |
| Appl. No.: | **07/375,561** |
| Filed: | **Jun. 29, 1989** |

Certificate of Correction issued Oct. 19, 1993.

Related U.S. Patent Documents

Reissue of:

| | |
|---|---|
| (64) Patent No.: | **4,677,655** |
| Issued: | **Jun. 30, 1987** |
| Appl. No.: | **06/740,206** |
| Filed: | **May 31, 1985** |

(30) Foreign Application Priority Data

Jun. 1, 1984 (JP) ..... 59-112375

(51) Int. Cl.[7] ..... H04M 11/10

(52) U.S. Cl. ..... 455/412; 455/462; 455/561; 379/82

(58) Field of Search ..... 455/403, 412, 455/426, 462, 465, 575, 90, 561; 379/70, 79, 82

(56) References Cited

U.S. PATENT DOCUMENTS

| | | | | |
|---|---|---|---|---|
| 4,074,081 A | | 2/1978 | Humm | 179/84 R |
| 4,451,707 A | | 5/1984 | Hashimoto | 179/84 R |
| 4,677,655 A | | 6/1987 | Hashimoto | 379/61 |
| 4,706,274 A | * | 11/1987 | Baker et al. | 455/462 |
| 5,455,857 A | | 10/1995 | McGuire | |

FOREIGN PATENT DOCUMENTS

| | | | |
|---|---|---|---|
| GB | 2114399 | 8/1983 | H04M/1/64 |
| GB | 2121648 | 12/1983 | H04M/1/64 |
| JP | S52-61410 | 5/1977 | H04M/1/64 |
| JP | S55-63157 | 5/1980 | H04M/1/64 |
| JP | S58-24245 | 2/1983 | H04B/1/40 |
| JP | S59-70326 | 4/1983 | H04B/7/26 |
| JP | S58-71245 | 5/1983 | H04B/7/26 |

OTHER PUBLICATIONS

RS-30 US Model Telephone Answering Machine Service Manual no date avail.

* cited by examiner

*Primary Examiner*—Nay Maung

(57) ABSTRACT

A cordless telephone having a base unit with automatic telephone answering function and a portable unit has an engaging means for forming an engaging circuit upon an incoming call from a calling party, when the portable unit is kept in the off-hook state over a preset period of time during sending of outgoing message from the base unit, and an outgoing message inhibiting circuit which activated by output of preset timer means and inhibit outgoing message then both parties' conversation can be recorded in recording means on base unit which is set in stand-by mode.

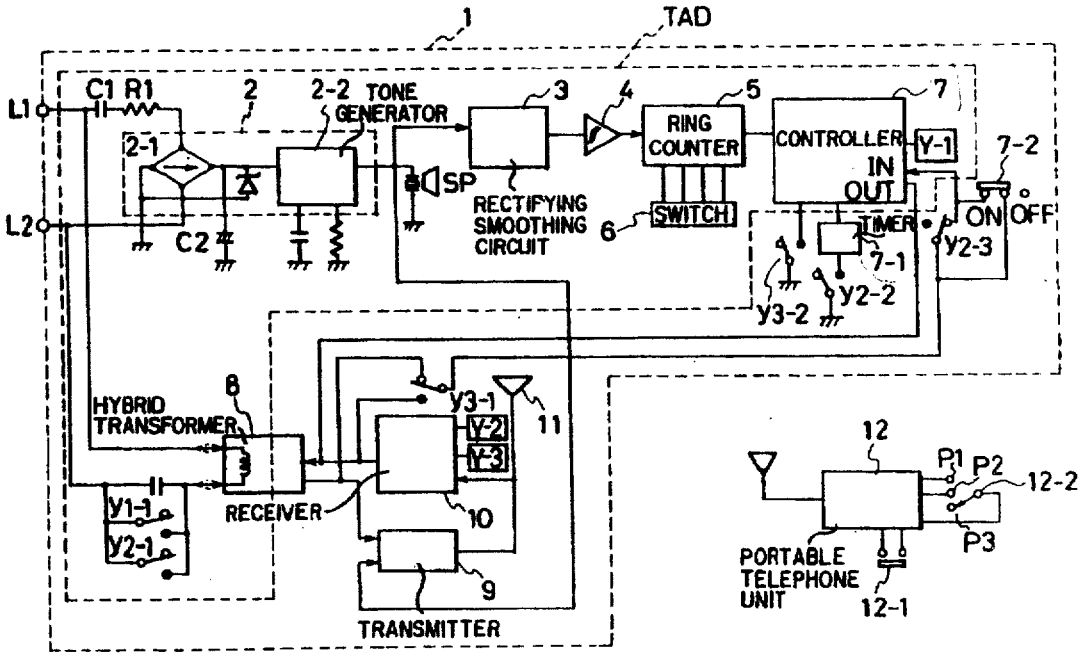

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 is confirmed.

New claims 8–50 are added and determined to be patentable.

*8. A cordless telephone, according to claim 1, wherein said portable unit is utilized to control said automatic telephone answering and recording means while communication between said remote calling party and said local called party is established.*

*9. A cordless telephone, according to claim 1:*

*further including a controller;*

*wherein said local called party utilizes said portable unit to call said base unit; and*

*wherein said controller is at least in part responsive to signals from said portable unit to control said automatic telephone answering and recording means.*

*10. A cordless telephone, according to claim 1:*

*further including a controller;*

*wherein said local called party utilizes said portable unit to call said base unit;*

*wherein said controller is at least in part responsive to signals from said portable unit to control engagement, answering, and recording of said incoming message.*

*11. A cordless telephone, according to claim 1:*

*further including a controller;*

*further including a plurality of relays operatively connected to said controller;*

*wherein said portable unit is utilized to control said automatic telephone answering and recording means through combined operation of said controller and said plurality of relays.*

*12. A cordless telephone, according to claim 1:*

*further comprising a controller;*

*wherein said controller includes:*

*(a) an outgoing message recording and reproducing means;*

*(b) an outgoing message recording medium;*

*(c) an incoming message recording and reproducing means; and*

*(d) an incoming message recording medium.*

*13. A cordless telephone according to claim 1, wherein the outgoing message generating means includes an IC memory for storing the outgoing message.*

*14. A cordless telephone according to claim 1, wherein the outgoing message generating means includes a magnetic tape for storing the outgoing message.*

*15. A cordless telephone according to claim 1, wherein the outgoing message inhibiting circuit is controlled by a control signal generated in response to placing the portable unit in the press talk mode.*

*16. A cordless telephone according to claim 15, wherein the control signal controls a switch in series with the outgoing message inhibiting means.*

*17. A cordless telephone according to claim 16, wherein the outgoing message inhibiting means includes a flip-flop having an output which controls operation of the telephone answering and recording means.*

*18. A cordless telephone according to claim 17, wherein the flip-flop is reset by the control signal when the portable unit is placed in the press talk mode.*

*19. A cordless telephone according to claim 16, further comprising a delay circuit in series with the switch and the outgoing message inhibiting circuit, wherein the delay circuit operates to modify the control signal to delay it for a selected time period after the portable unit is placed in the press talk mode.*

*20. A cordless telephone according to claim 1, further comprising a controller connected to the telephone answering and recording means, wherein the controller provides control functions to the telephone answering and recording means in response to signals received from the portable unit.*

*21. A cordless telephone according to claim 20, wherein the controller includes an incoming message inhibiting circuit for interrupting operating of an incoming message recording medium in response to a signal received from the portable unit.*

*22. A cordless telephone according to claim 21, wherein the incoming message recording medium comprises an IC memory.*

*23. A cordless telephone according to claim 20, wherein the controller provides a memo recording function for recording a memo from the portable unit on an incoming message recording medium.*

*24. A cordless telephone according to claim 1, further comprising:*

*an incoming message recording medium;*

*a control circuit for causing an incoming message to be recorded on the recording medium after an outgoing message is completed; and*

*an incoming message inhibiting circuit for interrupting recording of the incoming message when the portable unit is placed in the press talk mode.*

*25. A cordless telephone according to claim 24, wherein the incoming message recording medium comprises an IC memory.*

*26. A cordless telephone according to claim 25, wherein the outgoing message generating means includes an IC memory for storing the outgoing message.*

*27. A cordless telephone according to claim 24, wherein the incoming message recording medium is driven to record the incoming message by the control circuit.*

*28. A cordless telephone according to claim 2, wherein the calling party cannot hear the off hook operation of the portable unit during the predetermined time period.*

*29. A cordless telephone according to claim 2 wherein, if the calling party hangs up during the outgoing message, the outgoing message is heard at the portable unit at a different level, indicating that the calling party has hung up.*

*30. A cordless telephone according to claim 5, wherein the outgoing message generating means includes an IC memory for storing the outgoing message.*

*31. A cordless telephone according to claim 5, wherein the outgoing message generating means includes a magnetic tape for storing the outgoing message.*

*32. A cordless telephone according to claim 5, wherein the outgoing message inhibiting circuit is controlled by a control signal generated in response to placing the portable unit in the press talk mode.*

*33. A cordless telephone according to claim 32, wherein the control signal controls a switch in series with the outgoing message inhibiting means.*

*34. A cordless telephone according to claim 33, wherein the outgoing message inhibiting means includes a flip-flop having an output which controls operation of the telephone answering and recording means.*

*35. A cordless telephone according to claim 34, wherein the flip-flop is reset by the control signal when the portable unit is placed in the press talk mode.*

*36. A cordless telephone according to claim 33, further comprising a delay circuit in series with the switch and the outgoing message inhibiting circuit, wherein the delay circuit operates to modify the control signal to delay it for a selected time period after the portable unit is placed in the press talk mode.*

*37. A cordless telephone according to claim 5, further comprising a controller connected to the telephone answering and recording means, wherein the controller provides control functions to the telephone answering and recording means in response to signals received from the portable unit.*

*38. A cordless telephone according to claim 37:*

*wherein said telephone answering and recording means includes an incoming message recording medium; and*

*wherein the controller includes an incoming message inhibiting circuit for interrupting operating of an incoming message recording medium in response to a signal received from the portable unit.*

*39. A cordless telephone according to claim 38, wherein the incoming message recording medium comprises an IC memory.*

*40. A cordless telephone according to claim 37, wherein the controller provides a memo recording function for recording a memo from the portable unit on an incoming message recording medium.*

*41. A cordless telephone according to claim 5, further comprising:*

*an incoming message recording medium;*

*a control circuit for causing an incoming message to be recorded on the recording medium after an outgoing message is completed; and*

*an incoming message inhibiting circuit for interrupting recording of the incoming message when the portable unit is placed in the press talk mode.*

*42. A cordless telephone according to claim 41, wherein the incoming message recording medium comprises an IC memory.*

*43. A cordless telephone according to claim 42, wherein the outgoing message generating means includes an IC memory for storing the outgoing message.*

*44. A cordless telephone according to claim 41, wherein the incoming message recording medium is driven to record the incoming message by the control circuit.*

*45. A cordless telephone according to claim 1, wherein the calling party cannot hear the off hook operation of the portable unit.*

*46. A cordless telephone according to claim 5, wherein the calling party cannot hear the off hook operation of the portable unit.*

*47. A cordless telephone according to claim 1, wherein said telephone answering and recording means includes an IC memory for recording an incoming message.*

*48. A cordless telephone according to claim 5, wherein said telephone answering and recording means includes an IC memory for recording an incoming message.*

*49. A cordless telephone according to claim 1, wherein the telephone answering and recording means includes a memory medium for recording at least one of the outgoing message and an incoming message.*

*50. A cordless telephone according to claim 5, wherein the telephone answering and recording means includes a memory medium for recording at least one of the outgoing message and an incoming message.*

* * * * *